United States Patent [19]

Siemers et al.

[11] Patent Number: 5,271,776
[45] Date of Patent: Dec. 21, 1993

[54] ASYMMETRICAL METHOD FOR HIPING FILAMENT REINFORCED ANNULAR OBJECTS

[75] Inventors: Paul A. Siemers; Stephen F. Rutkowski, both of New York, N.Y.

[73] Assignee: General Electric Company, Schenectady, N.Y.

[21] Appl. No.: 842,685

[22] Filed: Feb. 27, 1992

[51] Int. Cl.$^5$ ............................................. B32B 15/14
[52] U.S. Cl. .................................. 29/419.1; 228/190; 72/342.4; 29/527.2
[58] Field of Search ..................... 428/614; 419/17, 16; 75/229, 236; 148/11.5 Q, 127; 228/190; 72/342.4

[56] References Cited

U.S. PATENT DOCUMENTS

| | | | |
|---|---|---|---|
| 5,045,407 | 10/1991 | Ritter | 428/614 |
| 5,058,411 | 10/1991 | Siemers et al. | 72/342.4 |
| 5,074,923 | 12/1991 | Siemers et al. | 148/11.5 |

OTHER PUBLICATIONS

"Hot Isotactic Pressing", Theory Appl., Proc. Int. Conf., 3rd Meeting 1991, 457-62, Miyamoto et al.

*Primary Examiner*—Patrick J. Ryan
*Assistant Examiner*—Richard C. Weisberger
*Attorney, Agent, or Firm*—James Magee, Jr.

[57] ABSTRACT

A method for asymmetrically consolidating a ring structure having a filamentary reinforcement embedded in a plasma sprayed deposited matrix is taught. The method involves fabricating a filament reinforced plasma sprayed deposit matrix structure and asymmetrically consolidating the structure. The asymmetric consolidation is accomplished by placing a thicker and/or stronger can surface on the outer portions of the ring structure and a thinner and/or weaker can structure on the inner and side surfaces of the reinforced ring structure. The HIPing of the reinforced ring structure with the asymmetric can results in a preferential compaction of the ring from the inside toward the outside and avoids the buckling of and damage to the reinforcement filaments on the outer portions of the structure.

8 Claims, 2 Drawing Sheets

ASYMMETRICAL METHOD FOR HIPING FILAMENT REINFORCED ANNULAR OBJECTS

CROSS REFERENCES TO RELATED APPLICATIONS

The subject application is closely related to applications now U.S. Pat. Nos. 5,058,411, filed Oct. 22, 1991; and 5,074,923, filed Dec. 24, 1991. The patents are incorporated herein by reference.

BACKGROUND OF THE INVENTION

The present invention relates generally to composite annular structures formed with a metal matrix and with a filament reinforcement. More particularly, it relates to annular structures having a titanium base matrix and reinforced by filaments of silicon carbide and to the HIPing of such structures to enhance the composite character thereof.

The preparation of titanium alloy base foils, sheets, and similar articles and of reinforced structures in which silicon carbide fibers are embedded in a titanium base alloy are described in U.S. Pat. Nos. 4,775,547; 4,782,884; 4,786,566; 4,805,294; 4,805,833; and 4,838,337 assigned to the same assignee as the subject application. The texts of these patents are incorporated herein by reference. Preparation of composites as described in these patents is the subject of intense study inasmuch as the composites have very high strength properties in relation to their weight. One of the properties which is particularly desirable is the high tensile properties imparted to the structures by the high tensile properties of the silicon carbide fibers or filaments. The tensile properties of the structures is related to the rule of mixtures. According to this rule, the proportion of the property, such as tensile property, which is attributed to the filament, as contrasted with the matrix, is determined by the volume percent of the filament present in the structure and by the tensile strength of the filament itself. Similarly the proportion of the same tensile property which is attributed to the matrix is determined by the volume percent of the matrix present in the structure and the tensile strength of the matrix itself.

Prior to the development of the processes described in the above-referenced patents, such structures were prepared by sandwiching the reinforcing filaments between foils of titanium base alloy and pressing the stacks of alternate layers of alloy and reinforcing filament until a composite structure was formed. However, that prior art practice was found to be less than satisfactory when attempts were made to form ring structures in which the filament was an internal reinforcement for the entire ring.

The structures taught in the above-referenced patents and the methods by which they are formed, greatly improved over the earlier practice of forming sandwiches of matrix and reinforcing filament by compression.

Later it was found that while the structures prepared as described in the above-referenced patents have properties which are a great improvement over earlier structures, the attainment of the potentially very high ultimate tensile strength of these structures did not measure up to the values theoretically possible. The testing of composites formed according to the methods taught in the above patents has demonstrated that although modulus values are generally in good agreement with the rule of mixtures predictions, the ultimate tensile strength is usually much lower than predicted by the underlying properties of the individual ingredients to the composite. A number of applications have been filed which are directed toward the overcoming the problem of lower than expected tensile properties. These include an application Ser. No. 07/445,203, filed Dec. 4, 1989 now U.S. Pat. No. 5,201,939 and U.S. Pat. Nos. 4,978,585, issued Dec. 18, 1990; 5,017,438, issued May 21, 1991; and 5,045,407, issued Sep. 3, 1991. The texts of these applications are incorporated herein by reference.

One of the structures which has been found to be particularly desirable in the use of the technology of these reference patents is an annular article having a metal matrix and having silicon carbide filament reinforcement extending many times around the entire ring. Rings of a few inches to a few feet in diameter are prepared with such reinforcing filaments. Such ring structures have very high tensile properties relative to their weight, particularly when compared to structures made entirely of metal.

The fiber reinforced ring can be used, for example, as a reinforcement ring structure for compressor disks of a jet engine. In order to serve to reinforce the disk in a compressor stage of a jet engine a large number of layers of reinforcement are required. It has been found that it is very difficult to continue to add more and more layers of filament reinforcement to a ring structure because of differences in thermal expansion coefficient and other factors.

One of the problems which results from the continued addition of outer layers of filament reinforced matrix to a ring structure is that the outer rings tend to cause a compression and buckling of the outer filaments as conventional consolidation occurs during HIPing. Such buckling of the filaments can cause damage to the filaments and accordingly to the rings of which the filaments are a part. Such buckling tends to occur as the number of fiber layers is increased so that when the number reaches 20 or 30 successive layers, any additional layers which are added beyond such value can result in buckling and damage to the filaments, as the overall structure is consolidated through the HIPing operation.

One way in which this problem has been solved is by forming a series of concentric rings which are then assembled together to provide a reinforced ring structure having more than 100 layers of reinforcement. Such ring structures may be of quite large diameter of the order of a foot or several feet and must nevertheless be nested together within very close tolerances of only a few thousands of an inch.

BRIEF STATEMENT OF THE INVENTION

In one of its broader aspects, the objects of the present invention can be achieved by first providing an unconsolidated multilayer filament reinforced ring structure.

The ring structure has a silicon carbide filamentary reinforcement embedded within a plasma deposited metal matrix. The ring is sealed within a HIPing can to have an annular shape conforming generally to that of the ring structure to be HIPed. The outer wall of the HIPing can be made to be substantially stronger than the inner and side walls of the can. The can and its contents are HIPed and the action of the HIPing on the contained ring is asymmetrical in that the inner and side walls undergo more movement as a result of the HIPing than does the outer wall. As a result, the ring structure is preferentially hipped from the inner and side surfaces and is thus asymmetrically HIPed. This asymmetrical HIPing causes the ring structure to be consolidated preferentially from the inside and avoids the buckling of and damage to the reinforcing filaments of the outer portions of the ring.

BRIEF DESCRIPTION OF THE DRAWINGS

The description which follows will be understood with greater clarity if reference is made to the accompanying drawings in which.

DETAILED DESCRIPTION OF THE INVENTION

Figure 1:
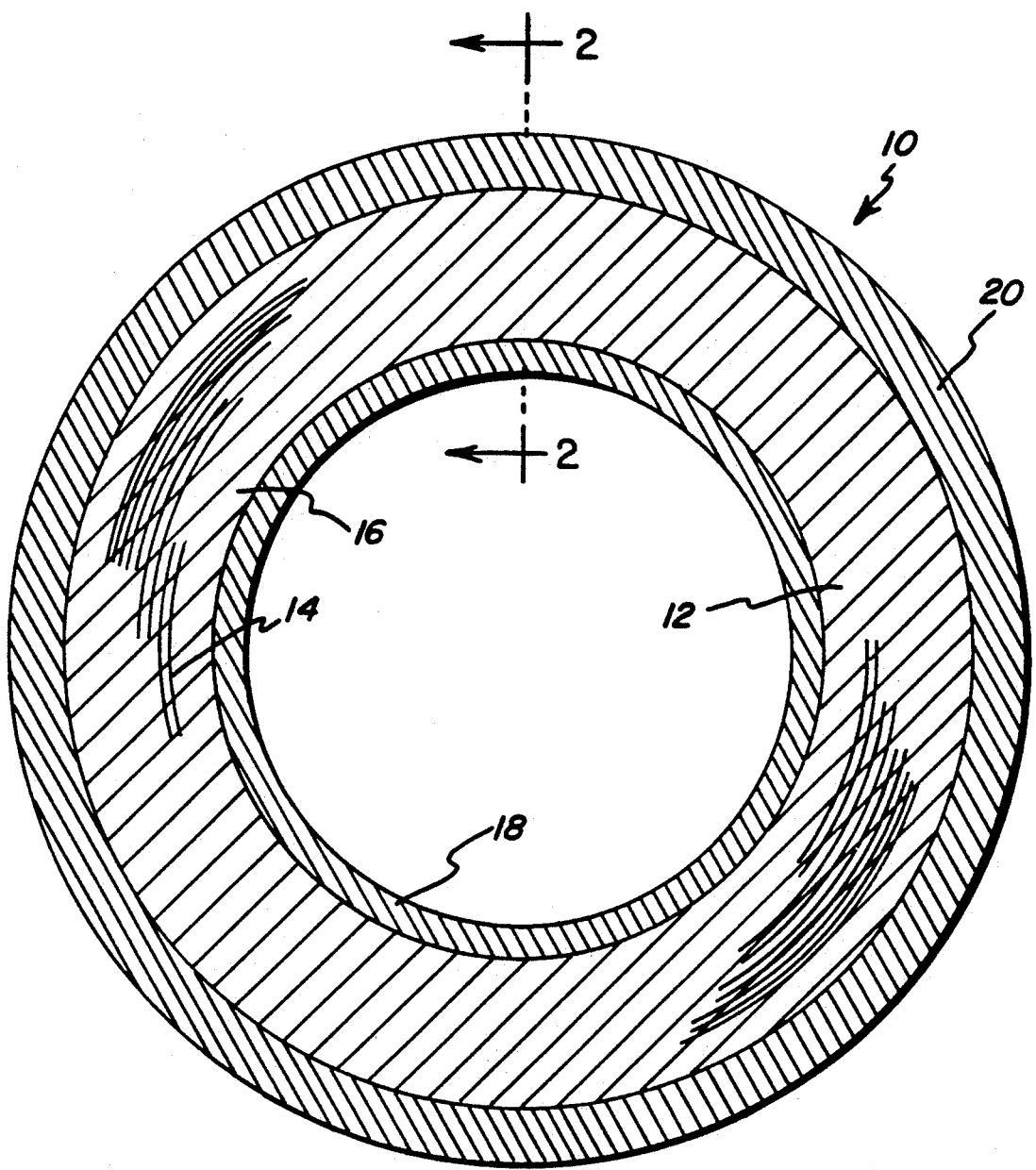
FIG. 1 is a radial section of a reinforced ring structure in an asymmetric HIPing can.

A low pressure r.f. plasma-spray process is used for the fabrication of multi-layer titanium base alloy ring elements where the titanium base alloy serves as a matrix in a composite structure containing reinforcing filaments. The low pressure r.f. plasma spray process may be that disclosed in the above patents or it may be that disclosed in copending application Ser. No. 07/524,527, filed May 17, 1990, now U.S. Pat. No. 5,120,567, the text of which is incorporated herein by reference.

The silicon carbide filaments are the principal filaments of concern for these reinforced composite structures. However, other reinforcing filaments including ceramic filaments such as single crystal $Al_2O_3$ filaments may be used as well.

The titanium base alloy can be a conventional titanium alloy, such as Ti-64, Ti-6242, or Ti-1421 or it can be a titanium aluminide. Such aluminide may be a gamma aluminide containing 48 atomic % titanium, 48 atomic % aluminum, 2 atomic % of niobium and 2 atomic % of chromium, for example. Titanium alloy Ti-64 has a composition of Ti-6Al-4V, by weight. Titanium alloy 6242 has composition Ti-6Al-2Sn-4Zr-2Mo, by weight. Titanium alloy 1421 has a composition Ti-14Al-21Nb by weight.

The composite ring elements, which may be from a few inches to a few feet in diameter, are fabricated by plasma-spraying of a ⅛ inch thick layer of the matrix alloy onto a cylinder of mild steel. The steel mandril is removed from the matrix alloy layer by chemical dissolution in a nitric acid solution or by thermal debonding using the thermal expansion difference between the titanium alloy matrix and the mild steel. The "as-sprayed" titanium alloy matrix ring is then wound with a continuous SiC filament as described in the patents referenced in the background statement above. The filament wound cylinder is then oversprayed with additional titanium base matrix alloy to completely cover the filament. The winding and spraying steps are repeated until the desired number of plies is obtained on the composite ring element.

Since the low pressure RF plasma-spray process yields an as-sprayed density less than theoretical, it is necessary to HIP densify the composite ring. The term HIP signifies heating and isostatic pressing which is a well-known conventional processing step. The dimensional change of the ring during HIPing can lead to fiber buckling in the outermost layers of the composite ring. Such buckling can break fibers and reduce the strength of the composite ring. Using this practice, there is a practical limit of 20 to 30 layers which can be deposited at one time before it becomes necessary to densify the ring. Such densification of a structure having 20 or 30 initial layers seeks to avoid the buckling and damage to the rings which is occasioned by the HIPing of a composite structure having more than 20 or 30 layers to be densified at one time.

However, the composite structure to be formed is one having as many as 150 layers. A structure with about 150 layers of composite is a novel structure which is deemed suitable for use, for example, as reinforcing rings in aircraft engine compressor structures. One way of achieving this number of layers is by "nesting" multiple composite ring elements which are separately fabricated. Following the separate fabrication such composite ring elements are "nested" together to form a ring assembly which can be HIP bonded to form a composite ring with the desired number of plies.

We have discovered that it is possible to HIP a reinforced multilayer ring structure having many layers of reinforcement of silicon carbide filament. For example, we can obtain a structure which has a lower level of buckling of the outer reinforcing filaments, or no such buckling or damage to such outer filaments, through a novel process which we have devised. Our novel process is described now with reference the accompanying drawings.

Referring now first to FIG. 1, FIG. 1 is a radial section of a ring structure in which a filament reinforcement, such as silicon carbide, is embedded in a plasma spray deposited titanium base alloy matrix. The ring structure 12 is made up of reinforcing filament 14 and embedding matrix 16. The reinforcement 14 is not illustrated fully around the ring or in the number of layers actually present in the ring for clarity of illustration and reference. In a sample, such as illustrated in FIG. 1, the number of reinforcing layers of filament would exceed 20 and may very well exceed 30 individual layers. Such layers are, as indicated above, formed by winding a single filament around the entire circumference of the ring structure prior to the plasma spray depositing of the next layer of titanium base alloy. The ring structure 12 is enclosed within a HIPing can for purposes of consolidation to full density. The can includes an inner thinner layer 18 of a canning metal such as a mild steel and an outer thicker layer 20 of such a mild steel canning material.

Figure 2:
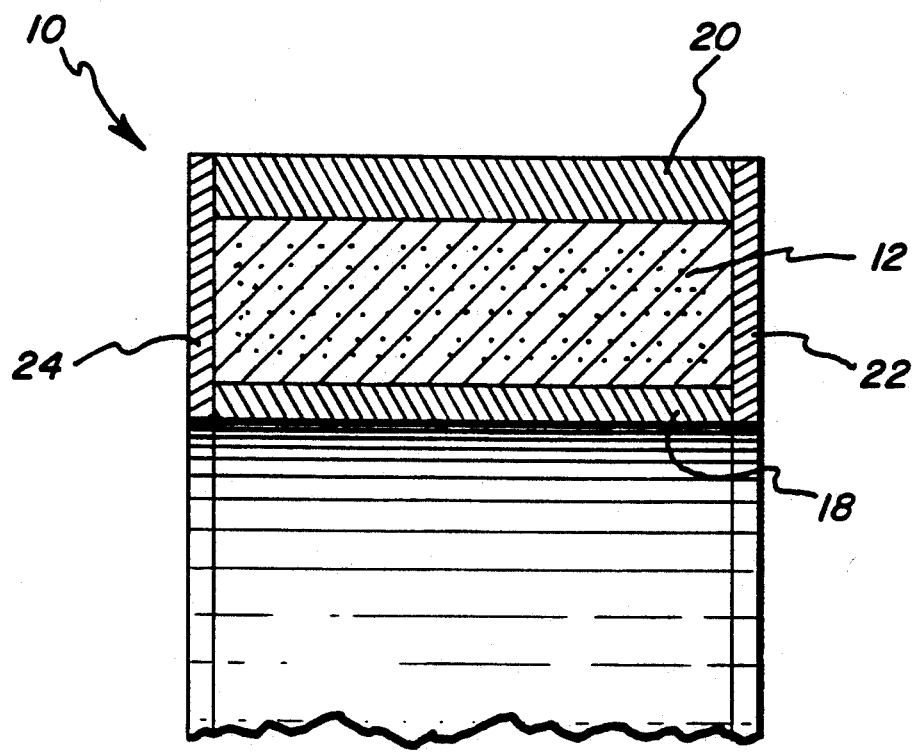
FIG. 2 is an axial section taken through one half of the ring structure and can of FIG. 1.

The section taken along the axis of the ring structure is illustrated in FIG. 2. In this figure the outer thicker section 20 encloses the outermost surface of the fiber reinforced ring structure 12 while thinner canning elements 18, 22 and 24 form the other three enclosing surfaces of an essentially annular canning element 10.

In the sectional view of FIG. 2, the rows of reinforcing elements, shown as dots in the figure, are illustrated in a smaller number than actually exists in the structure. This smaller number of the reinforcing filaments are illustrated in this fashion for clarity of illustration of representation. Enclosing HIPing can 10 is welded in place on the ring structure 12 so as to provide a closely fitting annular housing for the ring structure. It is then evacuated through a conventional vacuum port, which is not shown in the figures. Following the evacuation, the ring structure and its enclosing can are HIPed within a HIPing environment at elevated temperature and pressure for a suitably long time. HIPing may be carried out, for example, at 1000° C., 15 ksi for one or two or more hours.

HIPing of the structure, as illustrated in FIGS. 1 and 2, produces some novel effects in the ring structure 12 and these novel effects are now described.

One such novel effect is that the HIPing of the ring structure is asymmetrical. By this is meant that the pressure of a HIP operation is potentially isostatic. The phrase "HIP" itself means heating and isostatic pressing. A HIPing occurs where a structure is placed in a HIPing environment because the environment is at elevated pressure and acts with the same pressure on all surfaces of the article to be HIPed. However, the applicants have modified the practice in carrying out the present invention. Pursuant to the present invention, the can which is employed to house the article to be HIPed is not formed of uniform wall thickness or wall strength. Rather, the wall thickness or strength of the exterior wall 20 is greater than that of the interior wall 18 and also of the lateral walls 22 and 24. Because the outer wall has a greater thickness or strength, it resists the compression of the HIPing atmosphere and the result is that the HIPing action acts with greater force and effect on the interior wall 18 as well as on the lateral walls 22 and 24. As a consequence of the uneven application of pressure, greater compaction of the ring structure 12 occurs at the interior and at the sides of the structure than occurs at the outer surface of the ring structure. This constitutes an asymmetric compaction or asymmetric consolidation of the ring structure itself. Because this compaction is outwardly asymmetric, there is a reduced tendency to cause buckling of and damage to the outer reinforcing filaments of the ring structure 12. The consolidation accordingly is accomplished by compressing from the sides and the internal surface of the ring to move the consolidated material toward the center of the body of the ring and outward from the center of the ring.

Because there is less compaction of the outer surface of the ring, it is possible to include a larger number of layers of reinforcing fibers in the ring structure to be consolidated. Thus if the ring structure suffers buckling and damage of the outer fibers when carrying out a conventional HIPing practice when there are 30 layers of reinforcing filaments in a ring, such as 12. It can be found that the 30 layers are successfully consolidated using the practice of the present invention because the buckling of the outer layers of filament and the damage which results from such buckling is avoided. The consolidation of the ring is accomplished but the buckling is prevented.

The following example illustrates the method of the present invention.

EXAMPLE

A single, nominally four inch diameter, four inch wide, four ply composite ring was fabricated using a Ti-14Al-21Nb matrix alloy and layers of SCS-6 SiC filament. The rings were fabricated by initially spraying a layer about ⅛ inch thick of Ti-1421 matrix alloy onto a steel mandrel that had been coated with 0.005 inches of Al$_2$O$_3$. After cooling, the ⅛ inch thick Ti-1421 ring debonded from the steel mandrel at the steel-Al$_2$O$_3$ interface.

A four ply composite ring was fabricated using the ⅛ inch thick Ti-1421 ring as mandrel. The composite ring was fabricated by alternately machining the "as-sprayed" surface smooth, machining a helical groove about 0.003" deep with a spacing of 112 grooves per inch, winding continuous SCS-6 SiC filament in the groove, and overspraying the wound ring with additional Ti-1421 material. The above process was repeated until four plies were provided on the ring. If the ring became "out-of-round" because of the repeated thermal cycles, the partially completed ring was restored to roundness by thermally sizing it on a solid 304L stainless steel mandrel at 950° C. for 15 minutes at temperature.

After plasma spray fabrication of the composite ring was completed, the composite four ply ring was cut into three rings of smaller widths.

Two of the narrower rings cut from the 4-inch wide ring were sealed in HIP cans which had been machined from mild steel. The HIP can design comprised an inner can ring, an outer can ring, and two end can rings which closely matched the dimensions of each composite ring. Provisions were made to evacuate the HIP cans prior to sealing. In one HIP can, the wall thickness of the inner can ring was the same as the wall thickness of the outer can ring (0.070"). For the second HIP can, the wall thickness of the outer can ring (0.210") was three times as thick as the wall thickness of the inner can ring (0.070"). The intent of the asymmetrical can design was to force the inside diameter of the ring to move outwards rather than have the outside diameter move inwards during the HIP densification.

The two HIP cans were HIP'd for 3 hours at 1000° C. at 15 ksi pressure. After HIPing, the cans were removed by chemical dissolution in an acid solution. Table I shows the inside and outside diameters of each ring pair before and after HIPing. It is evident from the Table that the inside diameter of the asymmetrical canned ring grew larger, but the symmetrically canned ring also decreased in diameter. In addition, the outside diameter of the asymmetrically canned composite ring decreased about 4 fold less than did the symmetrically canned composite ring. The data in the Table demonstrate that the desired densification effect was achieved using the asymmetric and the symmetric HIP cans.

TABLE

Nested Ring Dimensional Changes During HIPing

|  | ID Before (inches) | ID After (inches) | ID Difference (inches) | % Change |
|---|---|---|---|---|
| Symmetric | 3.367 | 3.362 | −0.005 | −0.15 |
| Asymmetric | 3.364 | 3.366 | +0.002 | +1.06 |
|  | OD Before (inches) | OD After (inches) | OD Difference (inches) | % Change |
| Symmetric | 3.655 | 3.647 | −0.008 | −0.22 |
| Asymmetric | 3.655 | 3.653 | −0.002 | −0.05 |

In general, it has been found that for a filament reinforcement embedded within a plasma sprayed deposited matrix, it is preferable to have the filament reinforcement portion of the composite in tension and to have the matrix portion of the composite in compression. It should be noted that the result of consolidation employing the asymmetric method of the present invention results in a structure which does have the filament reinforcement of the composite in tension and the matrix of the composite in compression.

One of the things which is beneficial in practice of the present invention for the asymmetric HIPing of ring shaped composite structures is that the structures are designed to operate in tension; that is their primary strength value is in developing a high tension as articles within the ring are urged outward. The reinforcing filament is wound in a circumferential fashion to enhance the tensile properties of the ring. In carrying out the asymmetric HIPing of the ring structure having a filament reinforcement, the effect is to move the inner portion of the ring structure outward and in doing so to reach the point at which the filament reinforcement resists the further outward movement of the material of the ring. In other words, the asymmetric HIPing of the ring structure takes advantage of the fact that a high tensile property resides within the reinforcing filament so that as the material is moved the material of the inner portion of the ring is moved outward during HIPing the reinforcement is placed under greater tension as this occurs and it is the greater tensile capability of the filament which is one of the most attractive properties of the filament reinforced ring structure. Accordingly, one of the features of the present invention is to provide a reinforced ring structure which optimizes through the asymmetric HIPing process, the enhancement of the application of the tensile property of the reinforcement. This contrasts entirely and distinctly with a prior practice of symmetric HIPing which has, as noted in the above specification, resulted in excessive compaction and as a result in damage to the outer filaments of the structure. It is deemed feasible because of this result of the asymmetric HIPing that rings having many more plies to the extent of 50 or 60 plies of reinforcement can be advantageously HIPped employing the practice of the present invention.

Also, pursuant to the present invention, it is possible to process rings which have greater concentrations of less dense material. For example, in the example given above, much of the less dense material is removed through the machining and grooving operations. However, because of the outward movement of material of the rings during the asymmetric HIPing, it is possible to HIP rings which have lower density initial matrices and to cause an outward movement of the matrix material to the point where the tensile properties of the reinforcing filaments take over and the outward movement is stopped by the tensile resistance of the filament reinforcement itself.

What is claimed is:

1. The method of HIPing a large multilayer reinforced ring structure which comprises:
   providing the large multilayer reinforced ring structure with a non-consolidated plasma deposited metal matrix embedding a filament reinforcement extending around the ring,
   sealing the ring within an annular HIPing can have a stronger outer wall and have weaker inner and side walls, and
   HIPing the can at a time, temperature and pressure to consolidate the ring.

2. The method of claim 1, in which the metal is a titanium base alloy selected from the group consisting of Ti3Al, TiAl, Ti-6242, Ti-64, and Ti-1421.

3. The method of claim 1, in which the reinforcement is a ceramic filament selected from the group consisting of silicon carbide filament and single crystal aluminum oxide filament.

4. The method of claim 1, in which the reinforcement is a silicon carbide filament and the matrix is a titanium base metal.

5. The method of claim 1, in which the reinforcement is a silicon carbide filament and the matrix is Ti-6242.

6. The method of claim 1, in which the reinforcement is a silicon carbide filament and the matrix is Ti-1421.

7. The method of claim 1, in which the reinforcement is a silicon carbide filament and the matrix is Ti-64.

8. The method of claim 1, in which the reinforcement is a silicon carbide filament and the matrix is a titanium aluminide.

* * * * *